(12) United States Patent
Ono

(10) Patent No.: US 9,428,064 B2
(45) Date of Patent: Aug. 30, 2016

(54) POWER SUPPLY SYSTEM AND POWER RECEIVING FACILITY

(71) Applicant: TOYOTA JIDOSHA KABUSHIKI KAISHA, Toyota-shi, Aichi-ken (JP)

(72) Inventor: Tomoya Ono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 179 days.

(21) Appl. No.: 14/312,070

(22) Filed: Jun. 23, 2014

(65) Prior Publication Data

US 2015/0015188 A1    Jan. 15, 2015

(30) Foreign Application Priority Data

Jul. 12, 2013 (JP) .................................. 2013-146629

(51) Int. Cl.
*H02J 7/00* (2006.01)
*B60L 11/18* (2006.01)

(52) U.S. Cl.
CPC ............ *B60L 11/18* (2013.01); *B60L 11/1816* (2013.01)

(58) Field of Classification Search
CPC ............................. B60L 11/18; B60L 11/1816
USPC .......................................................... 320/107
See application file for complete search history.

(56) References Cited

U.S. PATENT DOCUMENTS

| 2013/0106350 A1 | 5/2013 | Ono et al. | |
| 2014/0217972 A1* | 8/2014 | Ishii .......................... | B60L 3/00 320/109 |
| 2014/0232180 A1* | 8/2014 | Kinomura ............... | B60L 11/12 307/9.1 |

FOREIGN PATENT DOCUMENTS

| JP | 2002-315193 A | 10/2002 |
| JP | A-2013-051772 | 3/2013 |
| JP | A-2013-099114 | 5/2013 |
| WO | WO 2013/030653 A2 | 3/2013 |

* cited by examiner

*Primary Examiner* — Vuthe Siek
(74) *Attorney, Agent, or Firm* — Oliff PLC

(57) ABSTRACT

A power supply system includes: a vehicle; a power cable; and a distribution board configured to be capable of exchanging electric power with an electric power system and the power cable. The distribution board includes: an operation unit operated by a user to select one of a first mode in which the electric power system and the vehicle are interconnected with each other and a second mode in which the electric power system is disconnected from the vehicle and electric power is exchanged between the vehicle and a house; and a switching circuit that switches a source of supply for a receptacle, to which an electrical load is connected, between the electric power system and the power cable and switches the communication line, in accordance with the operation on the operation unit.

4 Claims, 8 Drawing Sheets

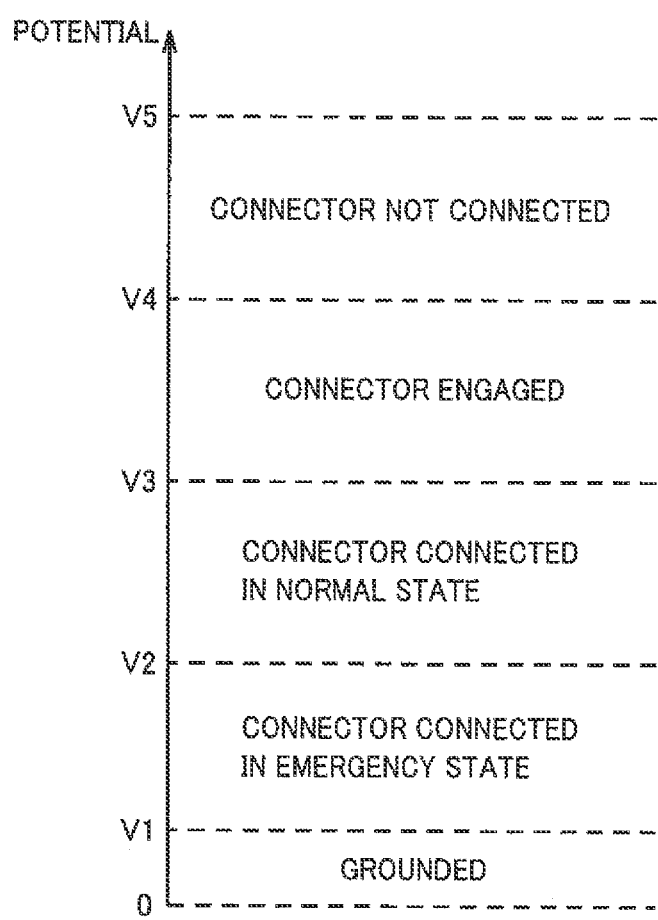

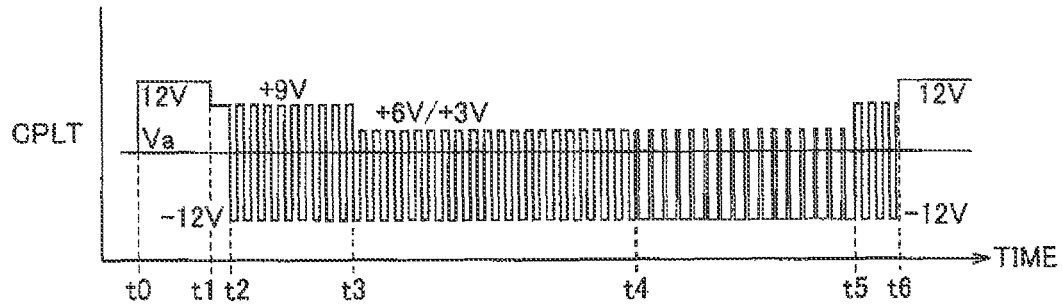
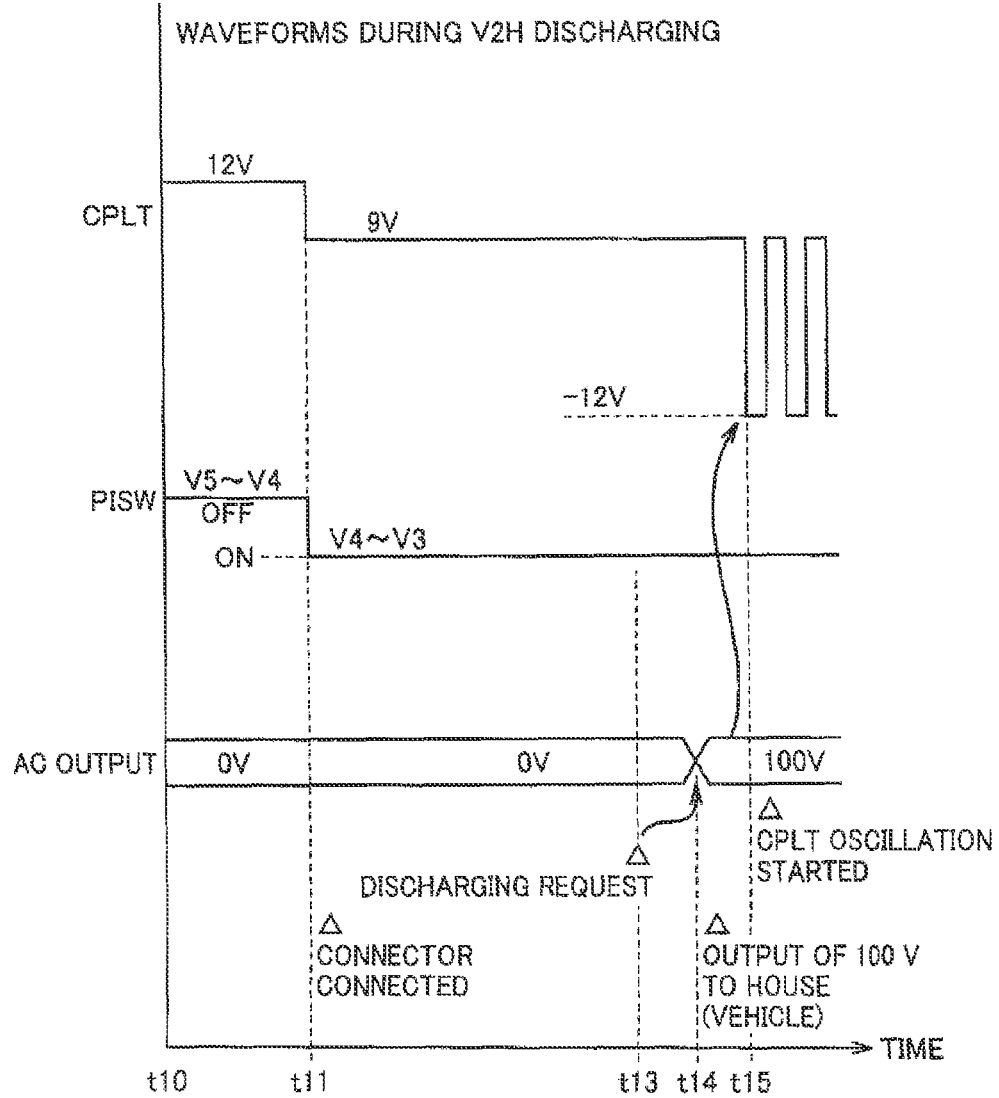

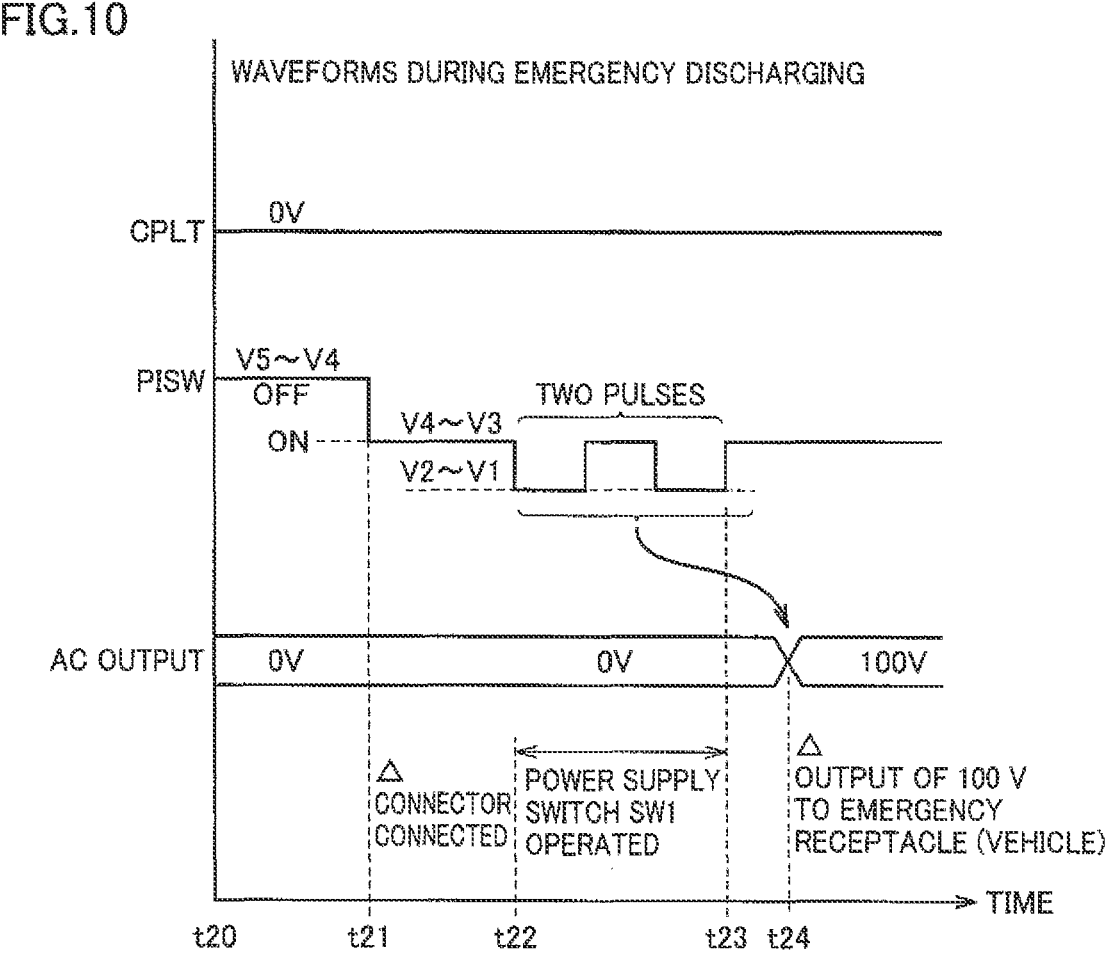

POWER SUPPLY SYSTEM AND POWER RECEIVING FACILITY

This nonprovisional application is based on Japanese Patent Application No. 2013-146629 filed on Jul. 12, 2013 with the Japan Patent Office, the entire contents of which are hereby incorporated by reference.

BACKGROUND OF THE INVENTION

1. Field of the Invention

The present invention relates to a power supply system and a power receiving facility, in particular, a power supply system including a vehicle capable of supplying electric power to outside the vehicle, and a power receiving facility capable of receiving the electric power from such a vehicle.

2. Description of the Background Art

Conventionally, there have been proposed an external power supply system that supplies electric power of a battery of a vehicle to a house or an external load during an emergency state, as well as a system that supplies electric power from an external power source to a vehicle.

As one example of such techniques, Japanese Patent Laying-Open No. 2013-99114 discloses a vehicle configured to be capable of mutually transferring electric power between the vehicle and an external component during a normal state under control of a charging/discharging management system provided in a house or the like and to be capable of supplying electric power from the vehicle to the external component during an emergency state independently of the charging/discharging management system, for example.

In order to switch between an operation mode for the normal state (normal mode) and an operation mode for the emergency state (emergency mode), the configuration disclosed in Japanese Patent Laying-Open No. 2013-99114 requires operations on a plurality of switches such as: a selector switch for a connector portion connected to the vehicle; a selector switch provided in a charging/discharging station; and a selector switch provided in a distribution board of a house. This makes it difficult for a user to understand the operations.

Moreover, these plurality of switches are arranged inside and outside the house in a distributed manner. In order to operate these switches, the user has to go out of and come back to inside the house. This is troublesome for the user.

SUMMARY OF THE INVENTION

The present invention has an object to provide a power supply system and a power receiving facility, each of which is configured to allow for operation mode switching readily understandable and easily operable by a user.

In summary, the present invention provides a power supply system including: a vehicle including a power storage device and configured to be capable of outputting electric power of the power storage device to outside the vehicle via a power cable connection port; a charging/discharging connector configured to be connectable to the power cable connection port and having a switch for providing a power supply start signal from the vehicle to outside; a power cable having one end connected to the charging/discharging connector and including a power line and a communication line via which a signal for use in control of charging/discharging is transmitted to the vehicle; and a distribution board provided in a house and configured to be capable of exchanging electric power with an electric power system and the power cable. The distribution board includes: an operation unit operated by a user to select one of a first mode in which the electric power system and the vehicle are interconnected with each other and a second mode in which the electric power system is disconnected from the vehicle and electric power is exchanged between the vehicle and the house; and a switching circuit that switches a source of supply for a receptacle, to which an electrical load is connected, between the electric power system and the power cable and switches the communication line, in accordance with the operation on the operation unit.

Preferably, the switching circuit includes: a first switch that disconnects the power cable and the electric power system from each other and connects the power cable and the receptacle to each other when the second mode is selected; a second switch that disconnects the receptacle and the electric power system from each other when the second mode is selected; and a signal selector switch that switches the signal from a normal signal to an emergency power supply signal.

More preferably, the signal selector switch includes: a third switch that switches a proximity detection signal; and a fourth switch that switches a control pilot signal.

Further preferably, the first to fourth switches are cooperative switches collectively provided and configured to operate in cooperation with one another in accordance with the operation on the operation unit.

In another aspect, the present invention provides a power receiving facility that exchanges electric power with a vehicle including a power storage device and configured to be capable of outputting electric power of the power storage device to outside the vehicle via a power cable connection port. The power receiving facility includes: a charging/discharging connector configured to be connectable to the power cable connection port and having a switch for providing a power supply start signal from the vehicle to outside; a power cable having one end connected to the charging/discharging connector and including a power line and a communication line via which a signal for use in control of charging/discharging is transmitted to the vehicle; and a distribution board provided in a house and configured to be capable of exchanging electric power with an electric power system and the power cable. The distribution board includes: an operation unit operated by a user to select one of a first mode in which the electric power system and the vehicle are interconnected with each other and a second mode in which the electric power system is disconnected from the vehicle and electric power is exchanged between the vehicle and the house; and a switching circuit that switches a source of supply for a receptacle, to which an electrical load is connected, between the electric power system and the power cable and switches the communication line, in accordance with the operation on the operation unit.

According to the present invention, a switching operation between a normal mode and an emergency mode becomes readily understandable and easily operable for a user.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows one example of a relation between a potential of signal PISW and a connection state.

FIG. 8 is a waveform diagram of a control pilot signal CPLT in a charging mode.

FIG. 9 is a waveform diagram of control pilot signal CPLT and connection signal PISW during discharging in the normal mode (during V2H discharging).

FIG. 10 is a waveform diagram of control pilot signal CPLT and connection signal PISW during discharging in an emergency mode.

DESCRIPTION OF THE PREFERRED EMBODIMENTS

Figure 1:
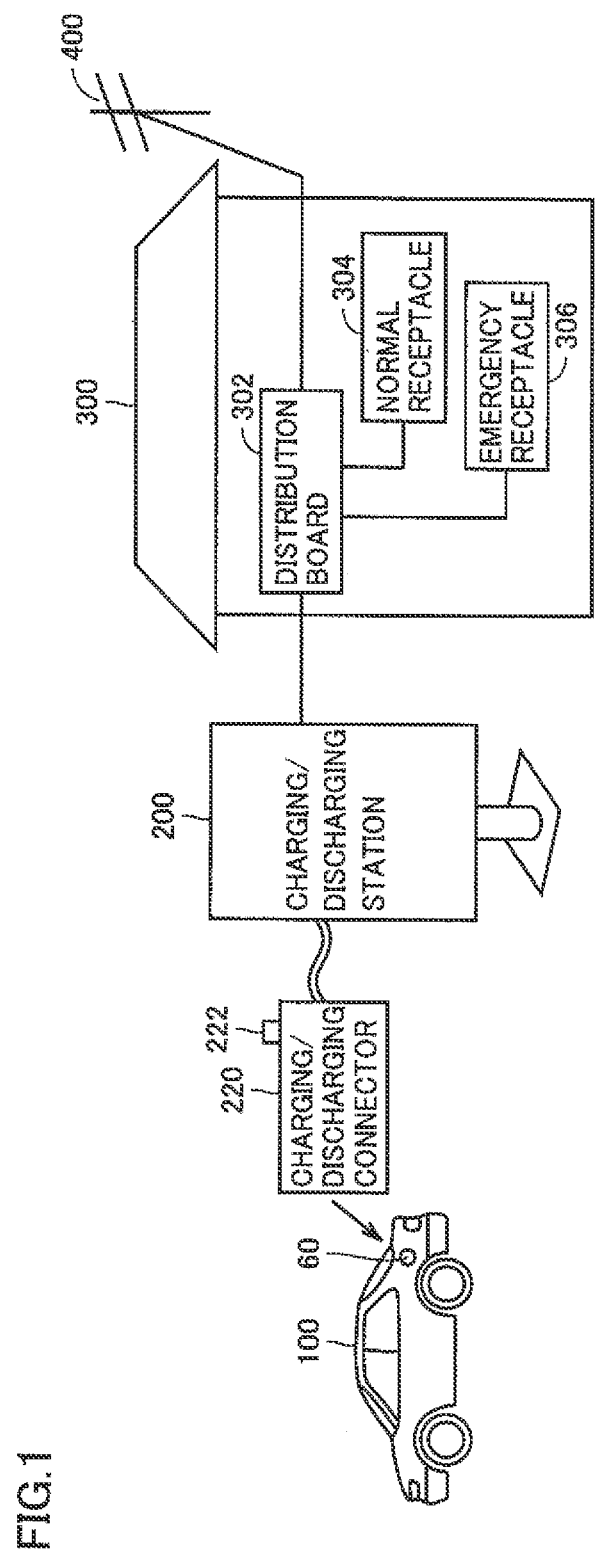
FIG. 1 shows a configuration of a power supply system of an embodiment of the present invention to which a vehicle and a power receiving device are applied.

The following describes an embodiment of the present invention in detail with reference to figures. It should be noted that the same or corresponding portions in the figures are given the same reference characters and are not described repeatedly.

FIG. 1 shows a configuration of a power supply system of the embodiment of the present invention to which a vehicle and a power receiving device are applied. Referring to FIG. 1, the power supply system includes a vehicle 100, a charging/discharging station 200, and a distribution board 302 provided in a house 300.

A power cable connection port 60 (hereinafter, referred to as "inlet 60") is provided in vehicle 100. A charging/discharging connector 220 can be connected to inlet 60.

Charging/discharging station 200 is disposed between charging/discharging connector 220 and distribution board 302. The charging/discharging station is disposed in the vicinity of the parking space of the vehicle. In the case where house 300 and the parking space are close to each other, the charging/discharging station may be disposed in the house or may be integrated with distribution board 302.

In a normal mode (or V2H mode), the vehicle is charged with electric power from the house or the house is supplied with electric power from the vehicle in accordance with shortage and excess of electric power in consideration of electric power used by a normal receptacle 304 and an emergency receptacle 306 of the house and electric power generated by a photovoltaic power generating device (not shown in the figure) of the house. Further, control in the normal mode may be such that the vehicle is charged during midnight and the house is supplied with electric power from the vehicle during peak power demand in the case where electricity price differs depending on a time zone.

In an emergency mode, electric power is supplied to emergency receptacle 306 from vehicle 100 via charging/discharging station 200 and distribution board 302.

The electric power supplied from vehicle 100 to the house is, for example, AC power of 100 V or 200 V, but the voltage thereof is not limited to this and can be changed appropriately.

Figure 2:
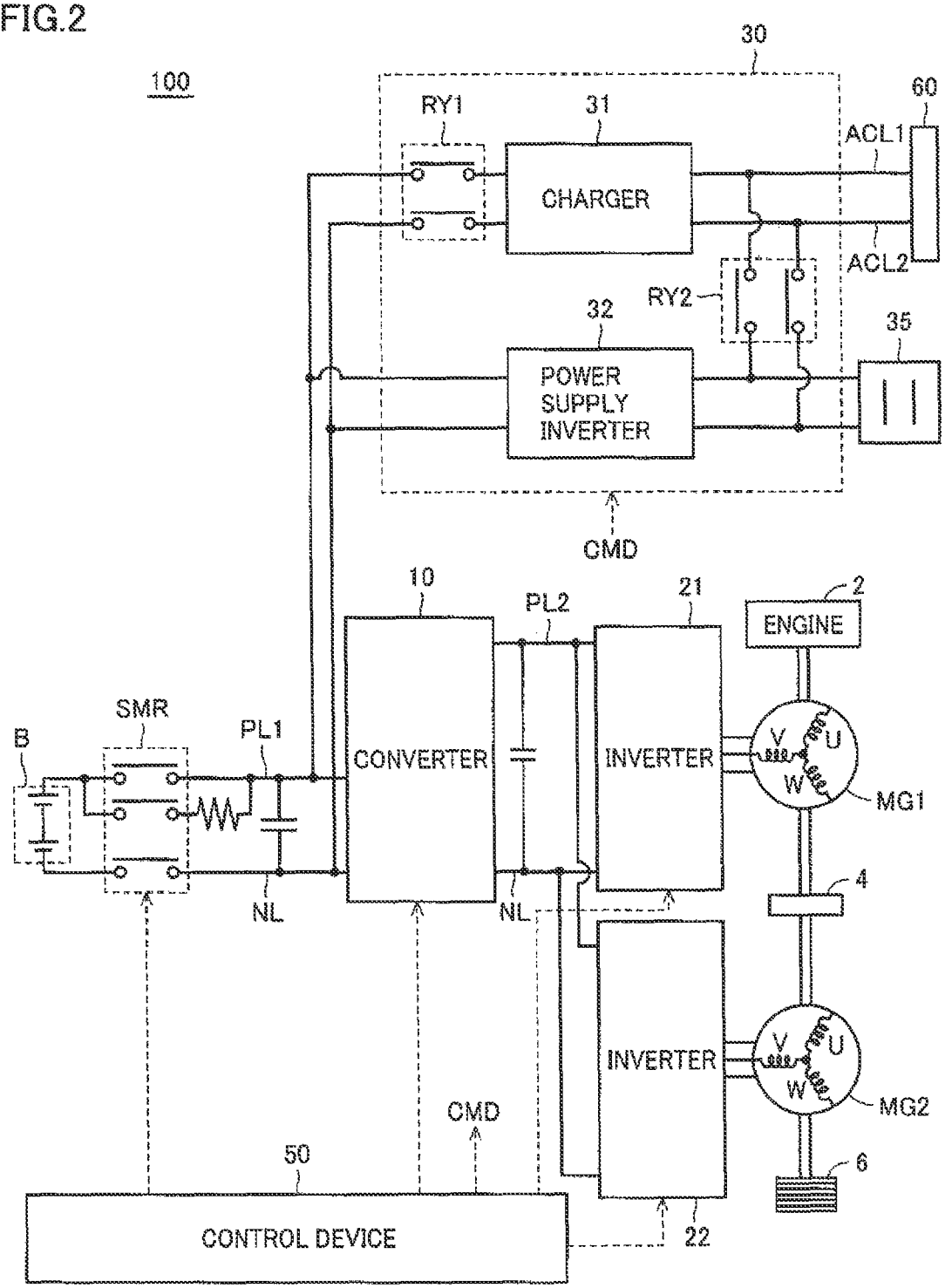
FIG. 2 is a block diagram showing a configuration of vehicle 100.

FIG. 2 is a block diagram showing a configuration of vehicle 100. In the embodiment described below, it is assumed that the vehicle is a hybrid vehicle, but the vehicle of the present invention is not limited to the hybrid vehicle and may be an electric vehicle or a fuel cell vehicle.

Referring to FIG. 2, vehicle 100 includes an engine 2, motor generators MG1, MG2, a power split device 4, and driving wheels 6.

Vehicle 100 further includes a power storage device B, a system main relay SMR, a converter 10, inverters 21, 22, and a control device 50. Vehicle 100 further includes a power converting device 30, a receptacle 35, and inlet 60.

Vehicle 100 is a hybrid vehicle that travels using engine 2 and motor generator MG2 as a motive power source. Engine 2 and motor generator MG2 generate driving power, which is transmitted to driving wheels 6.

Engine 2 is an internal combustion engine that outputs motive power by burning fuel, such as a gasoline engine or a diesel engine. Engine 2 is configured such that its operation state such as a throttle opening angle (intake amount), a fuel supply amount, or an ignition timing can be electrically controlled in accordance with a signal from control device 50.

Each of motor generators MG1, MG2 is an AC rotating electrical machine, such as a three-phase AC synchronous motor. Motor generator MG1 is used as a power generator driven by engine 2 and is also used as a rotating electrical machine capable of starting engine 2. Electric power resulting from the power generation by motor generator MG1 can be used to drive motor generator MG2. Also, the electric power resulting from the power generation by motor generator MG1 can be supplied to an external device connected to vehicle 100. Motor generator MG2 is mainly used as a rotating electrical machine to drive driving wheels 6 of vehicle 100.

Power split device 4 includes a planetary gear mechanism having three rotation shafts of a sun gear, a carrier, and a ring gear, for example. The sun gear is coupled to the rotation shaft of motor generator MG1. The carrier is coupled to the crankshaft of engine 2. The ring gear is coupled to the driving shaft. Power split device 4 splits the driving power of engine 2 into motive power to be transmitted to the rotation shaft of motor generator MG1 and motive power to be transmitted to the driving shaft. The driving shaft is coupled to driving wheels 6. The driving shaft is also coupled to the rotation shaft of motor generator MG2.

Power storage device B is a chargeable/dischargeable DC power source, and is constructed of a secondary battery such as a nickel-hydrogen battery or a lithium ion battery or is constructed of a capacitor, for example. Power storage device B supplies electric power to converter 10, and is charged with electric power from converter 10 during power regeneration.

System main relay SMR is provided between power storage device B and converter 10. System main relay SMR is a relay for electrically connecting/disconnecting power storage device B and the electric system to/from each other, and is controlled to turn on/off by control device 50.

Converter 10 boosts the voltage supplied from power storage device B and supplies it to inverters 21, 22. Further, converter 10 steps down a voltage generated by motor generators MG1, MG2 and rectified by inverters 21, 22, so as to charge power storage device B.

Each of inverters 21, 22 is connected to converter 10 in parallel. Each of inverters 21, 22 is controlled in accordance with a signal from control device 50, Inverters 21, 22 convert DC power supplied from converter 10 into AC power so as to drive motor generators MG1, MG2 respectively.

Power converting device 30 is configured to be capable of exchanging electric power with an external device (not shown) connected to inlet 60. Also, power converting device 30 is configured to be capable of supplying electric power to an electrical device connected to receptacle 35 provided in a passenger compartment of the vehicle. Power converting device 30 is connected to inlet 60, receptacle 35, a positive electrode line PL1 between system main relay SMR and the converter, and a negative electrode line NL therebetween. It should be noted that power converting device 30 may be connected to power lines between power storage device B and system main relay SMR. Power converting device 30 includes a charger 31, a power supply inverter 32, and relays RY1, RY2.

Charger 31 is connected to inlet 60 via power lines ACL1, ACL2, and is connected to positive electrode line PL1 and negative electrode line NL via relay RY1. Based on a signal CMD from control device 50, charger 31 converts charging power, which is supplied from an external device connected to inlet 60, to a voltage level for power storage device B, and then outputs it to power storage device B so as to charge power storage device B. In the description below, the charging of power storage device B with the electric power of the external device will be also referred to as "external charging".

Power supply inverter 32 has an input side connected to positive electrode line PL1 and negative electrode line NL, and has an output side connected to inlet 60 via relay RY2 and power lines ACL1, ACL2. The output side of power supply inverter 32 is also connected to receptacle 35.

Power supply inverter 32 can convert electric power stored in power storage device B into electric power to be supplied to the electrical device connected to receptacle 35, and can output the converted electric power to the electrical device.

In the emergency mode, power supply inverter 32 can convert at least one of the electric power stored in power storage device B and the electric power generated by motor generator MG1 into the electric power to be supplied to emergency receptacle 306 of FIG. 1, and can output the converted electric power to emergency receptacle 306 via charging/discharging connector 220 connected to inlet 60.

In the normal mode, power supply inverter 32 can convert at least one of the electric power stored in power storage device B and the electric power generated by motor generator MG1 into the electric power to be supplied to distribution board 302 of house 300 via charging/discharging connector 220 of FIG. 1 connected to inlet 60, and can output the converted electric power to normal receptacle 304 and emergency receptacle 306.

In power supply inverter 32, voltage and upper limit current are determined based on signal CMD from control device 50.

In the present specification, the term "power supply" is intended to indicate that at least one of the electric power of power storage device B and the electric power generated by motor generator MG1 is output from the vehicle to a load or house external to the vehicle.

Relays RY1, RY2 are opened/closed based on signal CMD from control device 50. Relay RY1 is closed during charging from outside, and is opened during power supply to outside. Relay RY2 is opened during charging from outside, and is closed during power supply to outside.

Inlet 60 is configured to be capable of serving as both a power supply port for supplying the electric power of vehicle 100 to the external load, the house, or the like, and a charging port for charging vehicle 100 from the external power source. As described below, inlet 60 includes a terminal connected to power lines, and a terminal connected to signal lines. The signal lines include a signal line for detecting whether or not the connector of the cable to be connected to an external device is connected to inlet 60.

Control device 50 determines target driving power to be transmitted to driving wheels 6, based on an accelerator position, a brake stepping amount, a vehicle speed, and the like.

Then, control device 50 controls engine 2 and motor generators MG1, MG2 to attain a driving state in which the target driving power can be output efficiently. Further, control device 50 switches between and performs the charging from outside and the power supply to outside by controlling power converting device 30 and relays RY1, RY2 when the external load or the external power source is connected to inlet 60.

FIG. 2 shows the example in which vehicle 100 includes power converting device 30, but the present invention is not limited to such a configuration. The vehicle may be configured to output electric power in a different manner. For example, the vehicle may be configured to output electric power from a neutral point of stator coils of motor generators MG1, MG2 using inverters 21, 22 and the stator coils of motor generators MG1, MG2.

Figure 3:
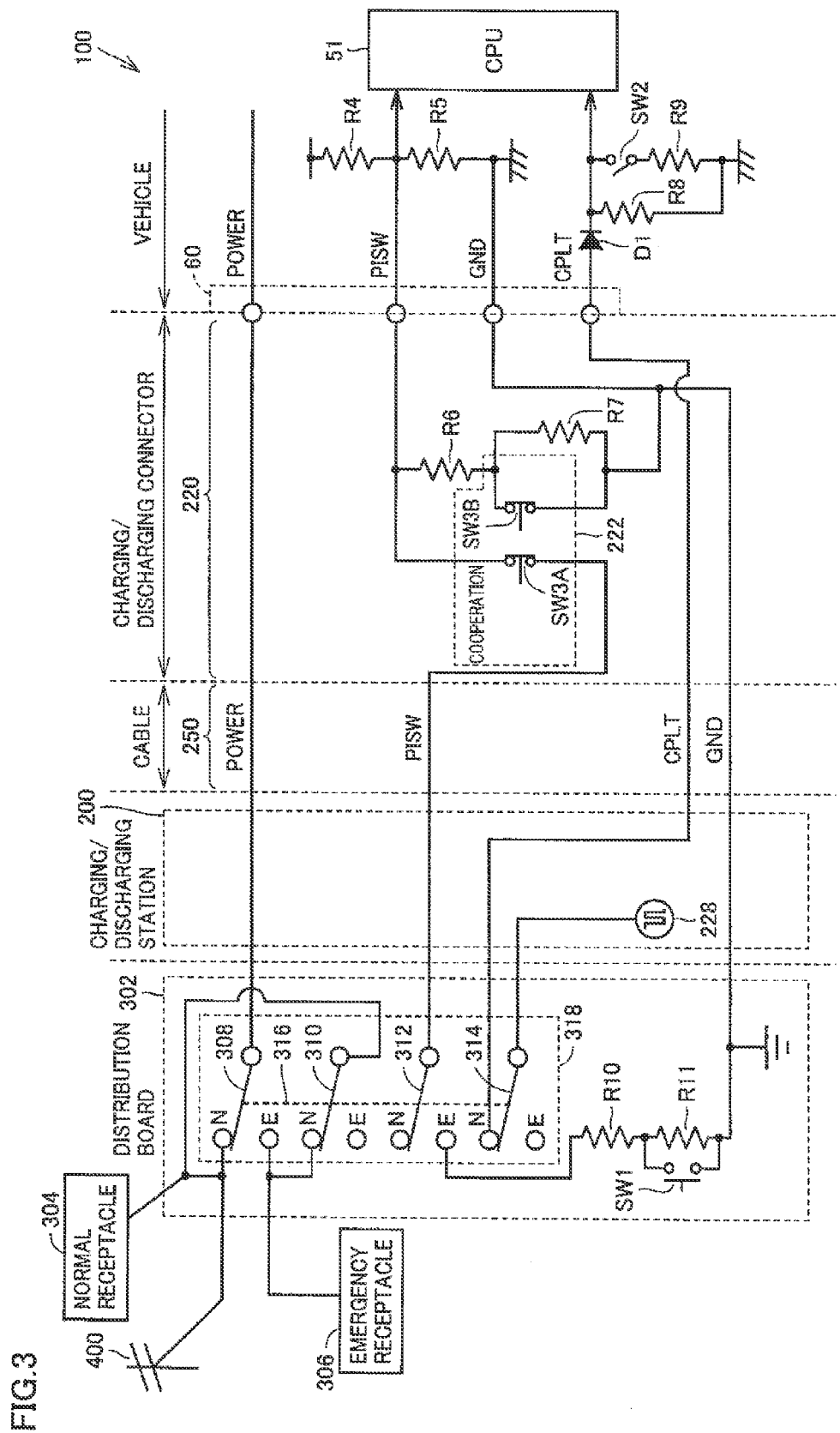
FIG. 3 is a circuit diagram showing a partial configuration of the power supply system of the present embodiment regarding generation of signals PISW and CPLT.

FIG. 3 is a circuit diagram showing a partial configuration of the power supply system of the present embodiment regarding generation of signals PISW and CPLT. Referring to FIG. 3, vehicle 100 includes resistors R4, R5, a CPU 51, and inlet 60.

Charging/discharging connector 220 includes resistors R6, R7 and a switch 222 (switches SW3A, SW3B). Power cable 250 includes: a pair of power lines POWER; signal lines for transmitting signals PISW, CPLT; and a signal line for providing a ground potential GND, which is a reference potential for the signal lines. Charging/discharging station 200 includes a CPLT oscillating circuit 228 for providing an oscillating signal to signal CPLT. The pair of power lines POWER are connected to the pair of power lines ACL1, ACL2 of FIG. 2 via inlet 60.

Distribution board 302 includes a switching circuit 318, resistors R10, R11, and a switch SW1 for instructing start of power supply.

Resistor R4 of vehicle 100 is connected between a constant voltage node (of 5V, for example) and the signal line for signal PISW. Resistor R5 is connected between the signal line for signal PISW and the ground node. A combined resistance determined by a combination of resistors R4, R5 and the resistors in charging/discharging connector 220 and distribution board 302 determines a potential of connection signal PISW, whereby the connection state of charging/discharging connector 220, release of connection lock, a power supply request by switch SW1, and the like can be detected in CPU 51 which receives connection signal PISW.

Vehicle 100 further includes a diode D1, resistors R8, R9, a switch SW2. These elements serve as a circuit for manipulating a potential (potential of control pilot line) of pilot signal CPLT generated by CPLT oscillating circuit 228 of charging/discharging station 200. Resistor R8 is connected between the ground node and the terminal of CPU 51 which receives control pilot CPLT. Switch SW2 and resistor R9 connected in series are connected to resistor R8 in parallel. Switch SW2 is driven by CPU 51.

By operating switch SW2, the resistance value of the combined resistance is changed, thereby changing the potential of pilot signal CPLT.

Based on connection signal PISW, CPU 51 detects a connection state of charging/discharging connector 220, a selection state of operation mode (emergency mode/normal mode) by a selector switch, and release of connection lock by means of a lock release button of the connector portion.

Resistors R6, R7 and switch 222 (switch SW3A or SW3B) of charging/discharging connector 220 serve as a circuit for allowing vehicle 100 to detect the connection state of charging/discharging connector 220 to inlet 60.

When the lock release button (not shown) for releasing the lock of the connection between charging/discharging connector 220 and inlet 60 of the vehicle is turned on by the user, the contact point of switch SW3A or SW3B is opened. Accordingly, the potential of connection signal PISW is changed by a predetermined amount, thus notifying CPU 51 that the lock has been released.

Switching circuit 318 of the distribution board includes switches 308, 310, 312, 314. These switches are configured to be switched in cooperation with one another. When the user operates an operation unit 316 (operation lever, for example), switches 308, 310, 312, 314 are collectively switched. As the operation unit, there may be employed a circuit that collectively switches the four switches when one switch is operated.

Each of switches 308, 310, 312, 314 has a contact point N selected in the normal mode, and has a contact point E selected in the emergency mode. In the normal mode, power lines POWER are connected to normal receptacle 304 and emergency receptacle 306 to which the electric power from electric power system 400 is supplied. In the emergency mode, power lines POWER are disconnected from normal receptacle 304 to which the electric power from electric power system 400 is supplied, and is only connected to emergency receptacle 306.

In the normal mode, in distribution board 302, the signal line for signal PISW is in the open state. In the emergency mode, the signal line for signal PISW is connected to the circuit constituted of resistors R10, R11 and switch SW1.

In the normal mode, in distribution board 302, the signal line for signal CPLT is connected to CPLT oscillating circuit 228. In the emergency mode, the signal line for signal CPLT is in the open state.

Figure 4:
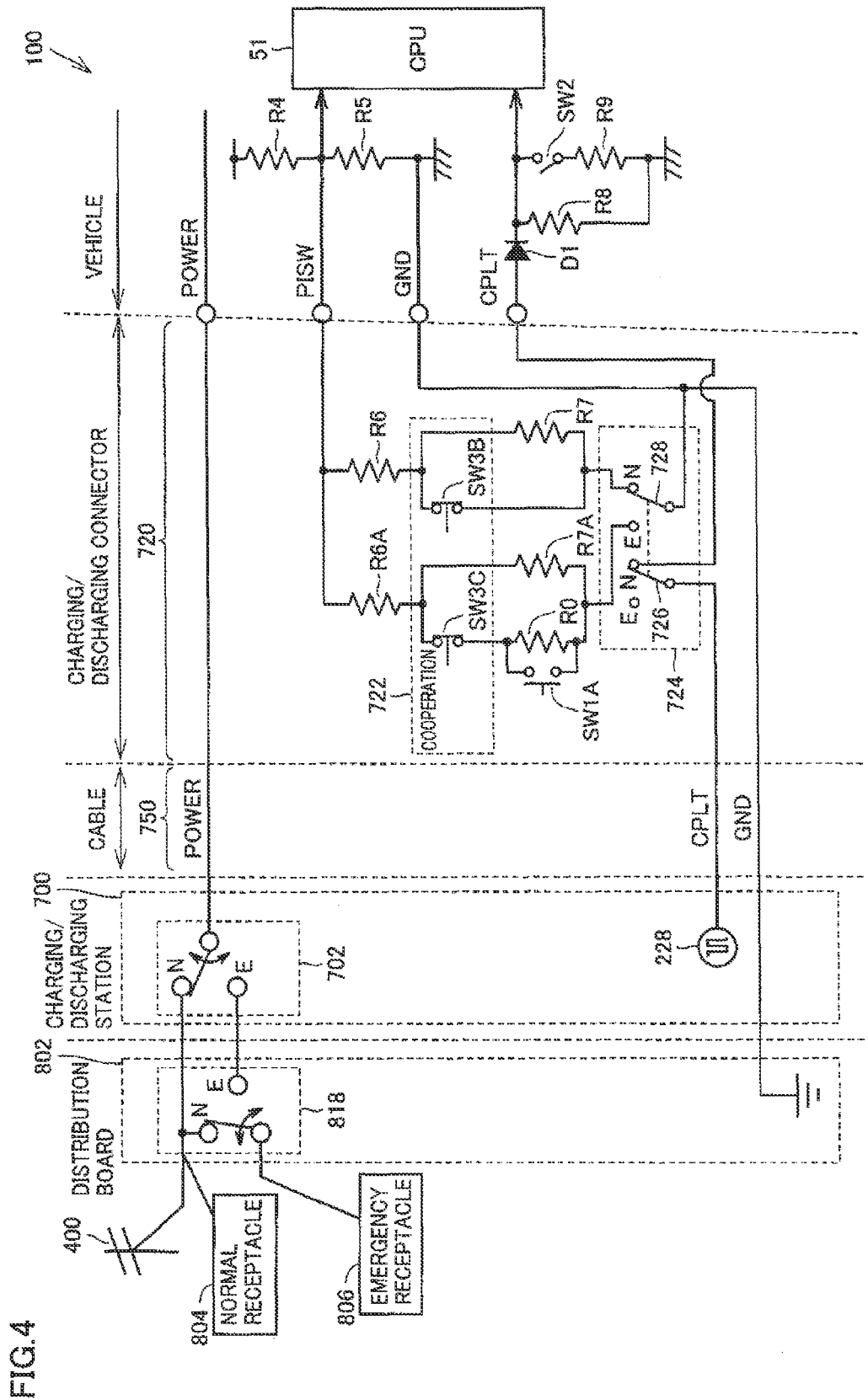
FIG. 4 shows a circuit configuration of a review example for illustration in comparison to FIG. 3.

FIG. 4 shows a circuit configuration of a review example for illustration in comparison to FIG. 3. The configuration of vehicle 100 in FIG. 4 is the same as that in FIG. 3 and is not therefore described repeatedly.

Referring to FIG. 4, charging/discharging connector 720 includes: a connection detecting circuit for detecting connection of the connector in the normal mode; a connection detecting circuit for detecting connection of the connector in the emergency mode; and a switching circuit 724 for selecting one of these connection detecting circuits. The two connection detecting circuits are connected in parallel between switching circuit 724 and the signal line for transferring, to vehicle 100, connection signal PISW indicating a connection state of charging/discharging connector 720, and one of them is selectively used by switching circuit 724.

The connection detecting circuit constituted of resistors R6, R7 and switch SW3B is a circuit selectively used during the normal mode. In other words, when the user selects the normal mode by operating switching circuit 724, switch 728 of switching circuit 724 is switched to the contact point N side.

Resistors R6, R7 are connected in series between the signal line for signal PISW and contact point N of switch 728. Switch SW3B is connected to resistor R7 in parallel.

The connection detecting circuit constituted of resistors R0, R6A, R7A, and switches SW1A, SW3C is a circuit selectively used during the emergency mode. In other words, when the user selects the emergency mode by operating switching circuit 724, switch 728 of switching circuit 724 is switched to the contact point E side.

Resistors R6A, R7A are connected in series between the signal line for signal PISW and contact point E of switch 728. Switch SW3C and resistor R0 connected in series are connected to resistor R7A in parallel. Further, switch SW1A is connected to resistor R0 in parallel.

Switch SW3C is operated in cooperation with switch SW3B. In other words, when the user turns on the lock release button, the contact points of switch SW3C and switch SW3B are opened. Accordingly, the potential of connection signal PISW is changed by a predetermined amount, thus notifying CPU 51 that the lock has been released.

Switch SW1A, which is operated by the user, is a switch for allowing the user to instruct start of power supply from vehicle 100 during the emergency mode. The user's operation causes switch SW1A to provide electrical connection and causes resistor R7 to be short-circuited, with the result that the potential of connection signal PISW is changed by a predetermined amount and CPU 51 is notified that switch SW1 has been turned on.

Switch 728 selects one of contact points E, N and is connected to ground line GND.

The two connection detecting circuits are designed to have resistance values different from each other. In accordance with the potential of connection signal PISW, CPU 51 is notified of the selection state of selector switch 728.

A charging/discharging station 700 includes CPLT oscillating circuit 228 and a selector switch 702. CPLT oscillating circuit 228 generates pilot signal CPLT for exchanging information with vehicle 100 in the normal mode. For example, by manipulating the potential of pilot signal CPLT in CPU 51 of vehicle 100 which receives pilot signal CPLT, a power source line relay provided in charging/discharging station 700 and not shown in the figure is remotely controlled from vehicle 100. Further, by changing the duty ratio of pilot signal CPLT, vehicle 100 is notified of an electric power parameter (such as MCB rated current or the like) of the house.

A distribution board 802 includes a selector switch 818. In the normal mode, selector switch 818 connects an emergency receptacle 806 to electric power system 400. In the emergency mode, selector switch 818 connects emergency receptacle 806 to power cable 750.

In the configuration shown in the review example of FIG. 4, in order to switch from the normal mode to the emergency mode, the user has to go out of and come back to inside the house when making switching as to switch 818 provided in distribution board 802, switch 702 provided in charging/discharging station 700, and switching circuit 724 provided in charging/discharging connector 720.

In contrast, in the configuration of the present embodiment as shown in FIG. 3, the switching circuit is centralized in distribution board 302, so that the user does not need to get out of and come back to inside the house. Further, the four switches are operated cooperatively. Hence, the switching operation is readily understandable for the user.

Figure 5:
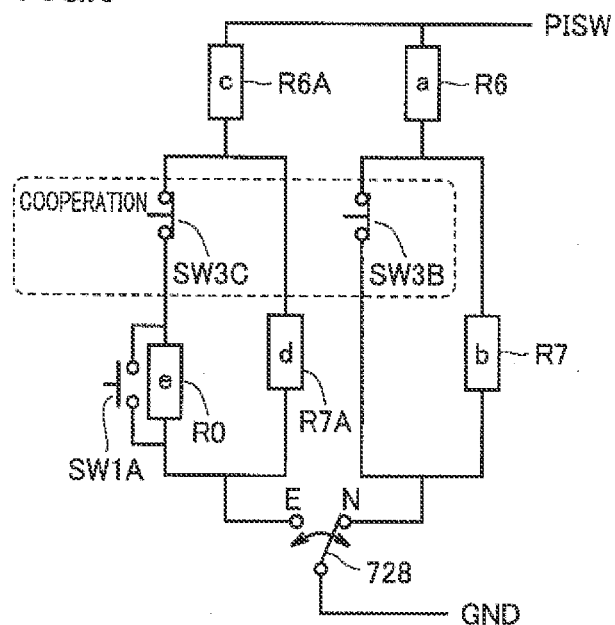
FIG. 5 shows a connection detecting circuit of charging/discharging connector 720 of the review example of FIG. 4.
Figure 6:
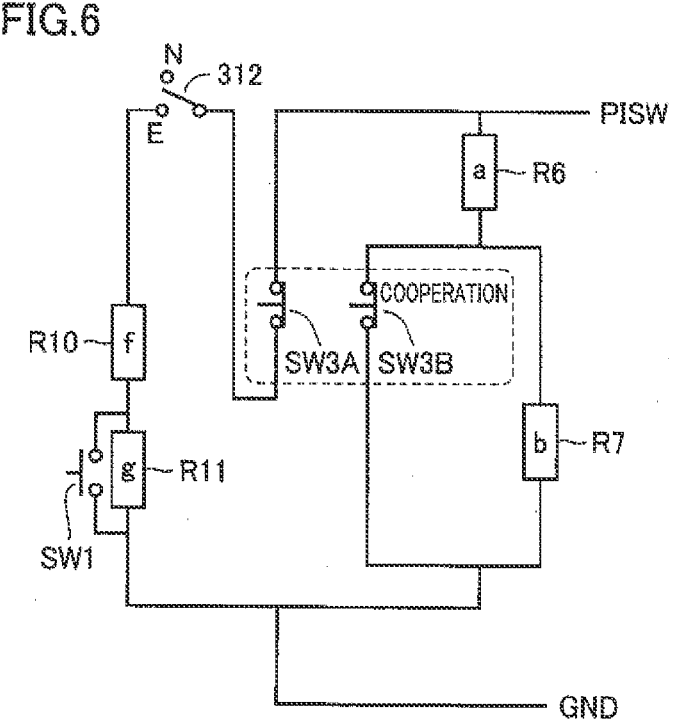
FIG. 6 shows a connection detecting circuit disposed in a charging/discharging connector 220 and a distribution board 302 of FIG. 3.

FIG. 5 shows the connection detecting circuits of charging/discharging connector 720 of the review example of FIG. 4. FIG. 6 shows the connection detecting circuit disposed in charging/discharging connector 220 and distribution board 302 of FIG. 3.

In FIG. 5 and FIG. 6, symbols "a" to "g" respectively represent the resistance values of the resistors. The circuit shown in FIG. 6 and the circuit shown in FIG. 5 are equivalent circuits. Switches SW3A, SW3B, SW3C are break switches which are in the ON state when not operated and are brought into the OFF state when pressed down. Switches SW1, SW1A are make switches which are in the OFF state when not operated and are brought into the ON state when pressed down.

In the normal mode, contact point N is selected, switch 312 is in the OFF state, and the circuit at the resistor R7 side is selected by switch 728. On this occasion, the resistors between the signal line for signal PISW and the ground node have a resistance value of a when switch SW3B is in the ON state, and have a resistance value of a+b when switch SW3B is in the OFF state.

In the emergency mode, contact point E is selected, switch 312 is in the ON state, and the circuit at the resistor R7A side is selected by switch 728. On this occasion, in the circuit of FIG. 5, the resistors between the signal line for signal PISW and the ground node have a resistance value of c+(d×e)/(d+e) when switch SW3C is in the ON state and switch SW1A is in the OFF state. On the other hand, in the circuit of FIG. 6, the resistors between the signal line for signal PISW and the ground node have a resistance value of (a×(f+g))/(a+f+g) when switch SW3A is in the ON state and switch SW1 is in the OFF state.

In this state, when switches SW1, SW1A are changed to the ON state, the resistors between the signal line for signal PISW and the ground node have a resistance value of c in the circuit of FIG. 5. On the other hand, in the circuit of FIG. 6, the resistors therebetween have a resistance value of (a×f)/(a+f).

Further, when switches SW3A, SW3B, SW3C are changed to the OFF state, the resistance value in the circuit of FIG. 5 becomes c+d whereas the resistance value in the circuit of FIG. 6 becomes a+b.

In other words, by determining values off and g to establish the following formulas, the circuit of FIG. 6 (embodiment) can be equivalent to the circuit of FIG. 5 (review example):

$$c+(d\times e)/(d+e)=(a\times(f+g))/(a+f+g) \quad (1)$$

$$c=(a\times f)/(a+f) \quad (2)$$

$$c+d=a+b \quad (3)$$

By selecting the resistance value in this way and employing the configuration of FIG. 3, the switches to be operated during the emergency mode can be collectively provided in the distribution board. In particular, switch SW1 can be disposed in the distribution board within the house, whereby a measure for prevention of moisture can be readily taken and an inexpensive switch can be employed therefor unlike the case of the review example in which switch SW1 is disposed in the connector portion of FIG. 4.

FIG. 7 shows one example of a relation between the potential of signal PISW and the connection state. It should be noted that the relation between the potential of connection signal PISW and the connection state is not limited to the relation shown in FIG. 7 and may differ in various manners.

Referring to FIG. 3 and FIG. 7, the resistance value of each of resistors R4, R5 is set such that when charging/discharging connector 220 is not connected to inlet 60 of vehicle 100 (hereinafter, also referred to as "Connector Not Connected"), connection signal PISW has a potential falling within a range from a potential V4 to a potential V5. By detecting that the potential of connection signal PISW falls within the range from potential V4 to potential V5, CPU 51 can detect that the connection state is "Connector Not Connected".

When charging/discharging connector 220 is connected to inlet 60 of vehicle 100, the signal line for connection signal PISW and ground line GND are connected to the connection detecting circuit constituted of the internal resistors of charging/discharging connector 220 and the resistors of the distribution board.

Each of switches SW3A, SW3B is a switch for detecting a state of the lock mechanism (not shown) provided in charging/discharging connector 220. This lock mechanism is provided to prevent charging/discharging connector 220 from being decoupled from inlet 60. When the user attaches/detaches charging/discharging connector 220 to/from inlet 60, the lock mechanism is released by pushing an operation button provided in charging/discharging connector 220. When the operation button is pushed, switches SW3A, SW3B are brought into the open state. When the pushing is ended, switches SW3A, SW3B are brought into the close state.

The resistance value of each of resistors R4 to R7, R10, R11 is set such that when charging/discharging connector 220 is connected to inlet 60 and the lock mechanism of charging/discharging connector 220 is released (hereinafter, also referred to as "Connector Engaged"), connection signal PISW has a potential falling within a range from a potential V3 to potential V4. By detecting that the potential of connection signal PISW falls within the range from potential V3 to potential V4, CPU 51 can detect that the connection state is "Connector Engaged".

The resistance value of each of resistors R4 to R7 is set such that connection signal PISW has a potential falling within a range from a potential V2 to potential V3 when the normal mode is selected by switching circuit 318, charging/discharging connector 220 is connected to inlet 60, and the lock mechanism of charging/discharging connector 220 is in operation (hereinafter, also referred to as "Connector Connected in Normal State"). By detecting that the potential of connection signal PISW falls within the range from potential V2 to potential V3, CPU 51 can detect that the connection state is "Connector Connected in Normal State".

The resistance value of each of resistors R4 to R7, R10, R11 is set such that connection signal PISW has a potential falling within a range from potential V1 to potential V2 when the emergency mode is selected by switching circuit 318, charging/discharging connector 220 is connected to inlet 60 and the lock mechanism of charging/discharging connector 220 is in operation (hereinafter, also referred to as "Connector Connected in Emergency State"). By detecting that the potential of connection signal PISW falls within the range from potential V1 to potential V2, CPU 51 can detect that the connection state is "Connector Connected in Emergency State".

It should be noted that CPU 51 detects that the signal line for connection signal PISW is short-circuited to the body earth of vehicle 100 when the potential of connection signal PISW is below potential V1 (hereinafter, also referred to as "Grounded").

FIG. 8 is a waveform diagram of control pilot signal CPLT in the charging mode. In the charging mode, vehicle 100 and charging/discharging station 200 communicate with each other using control pilot signal CPLT, as with the case of charging an electric vehicle from a conventional power station dedicated to charging.

Referring to FIG. 3 and FIG. 8, when charging/discharging connector 220 is connected to inlet 60 at a time t1, the resistance circuit is connected thereto to change the potential of signal CPLT from 12 V to 9 V. Then, at a time t2, CPLT oscillating circuit 228 starts oscillating. By means of the duty cycle of the waveform on this occasion, the vehicle is notified of a maximum current that can be output to vehicle 100.

At a time t3, in order to indicate that the vehicle is ready to receive electric power, switch SW2 is closed and the high-level amplitude potential of signal CPLT is changed from 9 V to 6 V or 3 V. During a period of time t3 to a time t4, charging is performed.

At time t4, the duty cycle of the waveform is changed to reduce the output current, in accordance with a request from the power grid, a change of manual setting in the charging/discharging station, or the like.

At a time t5, in response to the end of the charging at the vehicle side, switch SW2 is opened and the high-level amplitude potential of signal CPLT is brought back to 9 V again. Thereafter, at a time t6, in response to charging/discharging connector 220 being removed from inlet 60, the oscillation is stopped and signal CPLT is fixed at 12 V.

FIG. 9 is a waveform diagram of control pilot signal CPLT and connection signal PISW during discharging in the normal mode (during V2H discharging). FIG. 9 shows the waveform of signal CPLT, the waveform of connection signal PISW, and the voltage of the AC output supplied from the vehicle to the power station via the inlet in descending order.

Referring to FIG. 3 and FIG. 9, a period of a time t10 to a time t11 represents a state in which charging/discharging connector 220 is not connected to inlet 60. On this occasion, the potential of signal CPLT (at the power station side) is 12 V and the potential of signal PISW (at the vehicle side) is in a range of V5 to V4.

When charging/discharging connector 220 is connected to inlet 60 at a time t11, the potential of signal CPLT is changed from 12 V to 9 V and the potential of signal PISW is changed from the range of V5 to V4 to a range of V4 to V3.

At a time t13, a control device in the house such as an HEMS (Home Energy Management System) makes a discharging request to the vehicle. The discharging request may be transmitted to the vehicle by, for example, superimposing a high-frequency communication signal on signal CPLT, or may be transmitted to the vehicle through other communication means provided. When CPU 51 detects this, CPU 51 causes power supply inverter 32 of FIG. 2 to generate AC voltage of 100 V at a time t14.

In charging/discharging station 200, a voltage sensor not shown in the figure detects that the voltage of 100 V has been output. In response, an ECU 229 at the station side causes CPLT oscillating circuit 228 to start oscillating at a time t15.

FIG. 10 is a waveform diagram of control pilot signal CPLT and connection signal PISW during discharging in the emergency mode. FIG. 10 shows the waveform of signal CPLT, the waveform of connection signal PISW, and the voltage of the AC output supplied from the vehicle to the power station via the inlet in descending order.

Referring to FIG. 3 and FIG. 10, a period of a time t20 to a time t21 represents a state in which charging/discharging connector 220 is not connected to inlet 60. On this occasion, the potential of signal CPLT (at the power station side) is 12 V and the potential of signal PISW (at the vehicle side) is in a range of V5 to V4.

When charging/discharging connector 220 is connected to inlet 60 at a time t21, the potential of signal CPLT is changed from 12 V to 9 V and the potential of signal PISW is changed from the range of V5 to V4 to a range of V4 to V3.

When the user presses switch SW1 of distribution board 302 twice during a period of a time t22 to a time t23, two pulses are generated in signal PISW. When CPU 51 detects them, CPU 51 causes power supply inverter 32 of FIG. 2 to generate AC voltage of 100 V at a time t24. On this occasion, AC power with a predetermined upper limit current (such as an upper limit of 15 A) is supplied.

Finally, referring to FIG. 2, FIG. 3, and the like again, the present embodiment will be summarized. A power supply system of the present embodiment includes: a vehicle 100 including a power storage device B and configured to be capable of outputting electric power of power storage device B to outside the vehicle via a power cable connection port 60; a charging/discharging connector 220 configured to be connectable to power cable connection port 60; a power cable 250 having one end connected to charging/discharging connector 220 and including a power line and a communication line via which a signal for use in control of charging/discharging is transmitted to the vehicle; and a distribution board 302 provided in a house 300 and configured to be capable of exchanging electric power with an electric power system 400 and power cable 250. Distribution board 302 includes: an operation unit 316 operated by a user to select one of a first mode in which electric power system 400 and vehicle 100 are interconnected with each other and a second mode in which electric power system 400 is disconnected from vehicle 100 and electric power is exchanged between the vehicle and the house; and a switching circuit 318 that switches a source of supply for a receptacle 306, to which an electrical load is connected, between electric power system 400 and power cable 250 and switches the communication line, in accordance with the operation on operation unit 316.

By only operating operation unit 316 provided in distribution board 302 in this way, the mode switching is completed. Thus, the operation therefor can be performed only within the house by the user, thereby facilitating the operation.

Preferably, switching circuit 318 includes: a first switch 308 that disconnects power cable 250 and electric power system 400 from each other and connects power cable 250 and receptacle 306 to each other when the second mode is selected; a second switch 310 that disconnects receptacle 306 and electric power system 400 from each other when the second mode is selected; and a signal selector switch (312, 314) that switches the signal from a normal signal to an emergency power supply signal.

More preferably, the signal selector switch includes: a third switch 312 that switches a proximity detection signal PISW; and a fourth switch 314 that switches a control pilot signal CPLT.

Further preferably, first to fourth switches 308, 310, 312, 314 are cooperative switches collectively provided and configured to operate in cooperation with one another in accordance with the operation on operation unit 316.

By using such cooperative switches, the switching of the power line and the communication line can be completed by one operation.

In another aspect, the present invention provides a power receiving facility (200, 302) that exchanges electric power with a vehicle 100 including a power storage device B and configured to be capable of outputting electric power of power storage device B to outside the vehicle via a power cable connection port 60. The power receiving facility includes: a charging/discharging connector 220 configured to be connectable to power cable connection port 60; a power cable 250 having one end connected to charging/discharging connector 220 and including a power line and a communication line via which a signal for use in control of charging/discharging is transmitted to the vehicle; and a distribution board 302 provided in a house and configured to be capable of exchanging electric power with an electric power system 400 and power cable 250. Distribution board 302 includes: an operation unit 316 operated by a user to select one of a first mode in which electric power system 400 and vehicle 100 are interconnected with each other and a second mode in which electric power system 400 is disconnected from vehicle 100 and electric power is exchanged between vehicle 100 and the house; and a switching circuit 318 that switches a source of supply for a receptacle 306, to which an electrical load is connected, between electric power system 400 and power cable 250 and switches the communication line, in accordance with the operation on operation unit 316.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power supply system comprising:
   a vehicle including a power storage device and configured to be capable of outputting electric power of said power storage device to outside said vehicle via a power cable connection port;
   a charging/discharging connector configured to be connectable to said power cable connection port;
   a power cable having one end connected to said charging/discharging connector and including a power line and a communication line via which a signal for use in control of charging/discharging is transmitted to said vehicle; and
   a distribution board provided in a house and configured to be capable of exchanging electric power with an electric power system and said power cable,
   said distribution board including:
      an operation unit operated by a user to select one of a first mode in which the electric power system and said vehicle are interconnected with each other and a second mode in which said electric power system is disconnected from said vehicle and electric power is exchanged between said vehicle and said house; and
      a switching circuit that switches a source of supply for a receptacle, to which an electrical load is connected, between said electric power system and said power cable and switches said communication line, in accordance with the operation on said operation unit, said switching circuit including:
         a first switch that disconnects said power cable and said electric power system from each other and connects said power cable and said receptacle to each other when said second mode is selected,
         a second switch that disconnects said receptacle and said electric power system from each other when said second mode is selected, and
         a signal selector switch that switches said signal from a normal signal to an emergency power supply signal.

2. The power supply system according to claim 1, wherein said signal selector switch includes:
   a third switch that switches a proximity detection signal; and
   a fourth switch that switches a control pilot signal.

3. The power supply system according to claim 2, wherein said first to fourth switches are cooperative switches collectively provided and configured to operate in cooperation with one another in accordance with the operation on said operation unit.

4. A power receiving facility that exchanges electric power with a vehicle including a power storage device and configured to be capable of outputting electric power of said power storage device to outside said vehicle via a power cable connection port, comprising:
   a charging/discharging connector configured to be connectable to said power cable connection port;
   a power cable having one end connected to said charging/discharging connector and including a power line and a communication line via which a signal for use in control of charging/discharging is transmitted to said vehicle; and
   a distribution board provided in a house and configured to be capable of exchanging electric power with an electric power system and said power cable,
   said distribution board including:
      an operation unit operated by a user to select one of a first mode in which the electric power system and said vehicle are interconnected with each other and a second mode in which said electric power system is disconnected from said vehicle and electric power is exchanged between said vehicle and said house; and
      a switching circuit that switches a source of supply for a receptacle, to which an electrical load is connected, between said electric power system and said power cable and switches said communication line, in accordance with the operation on said operation unit, said switching circuit including:
         a first switch that disconnects said power cable and said electric power system from each other and connects said power cable and said receptacle to each other when said second mode is selected,
         a second switch that disconnects said receptacle and said electric power system from each other when said second mode is selected, and
         a signal selector switch that switches said signal from a normal signal to an emergency power supply signal.

* * * * *